United States Patent

McLaughlin et al.

[11] Patent Number: 5,837,634
[45] Date of Patent: Nov. 17, 1998

[54] PROCESS FOR PRODUCING STABILIZED ALUMINA HAVING ENHANCED RESISTANCE TO LOSS OF SURFACE AREA AT HIGH TEMPERATURES

[75] Inventors: Kevin J. McLaughlin, Austin; Ben L. Decker, Lago Vista; Mark M. Chavez, Round Rock, all of Tex.

[73] Assignee: Condea Vista Company, Houston, Tex.

[21] Appl. No.: 974,560

[22] Filed: Nov. 12, 1992

[51] Int. Cl.⁶ ..................................... C04B 35/10
[52] U.S. Cl. ........................... 501/127; 501/12; 501/153; 423/628; 252/315.7
[58] Field of Search ............................ 501/153, 12, 127; 423/628; 252/315.7

[56] References Cited

U.S. PATENT DOCUMENTS

| | | |
|---|---|---|
| 3,956,186 | 5/1976 | Iwase et al. . |
| 4,261,862 | 4/1981 | Kinoshita et al. . |
| 4,528,279 | 7/1985 | Suzuki et al. . |
| 4,676,928 | 6/1987 | Leach et al. . |
| 4,711,872 | 12/1987 | Kato et al. . |
| 4,722,920 | 2/1988 | Kimura et al. . |
| 4,771,028 | 9/1988 | Arai et al. . |
| 4,791,091 | 12/1988 | Bricker et al. . |
| 4,843,056 | 6/1989 | Matsumoto et al. . |
| 4,859,433 | 8/1989 | Pereira et al. . |

OTHER PUBLICATIONS

Machida, et al. *J. Am. Ceram. Soc.* 71 (12), 1142 (1989).
Mizukami, *Nippon Kagaku Kaishi,* No. 9, 1542 (1988).

*Primary Examiner*—Karl Group
*Attorney, Agent, or Firm*—Browning Bushman

[57] ABSTRACT

A process for preparing a stabilized alumina wherein an aqueous slurry of a precursor boehmite alumina is admixed with an effective amount of a stabilizer such as a water-soluble salt of a polyvalent metal cation of Groups IIA and IIIB of the periodic table, the slurry containing the alumina and the stabilizer being aged at a pH of from about 3 to about 9 and a temperature greater than about 70° C. for a period of time sufficient to convert the greater portion of said alumina to a colloidal sol, the colloidal sol being recovered and calcined to produce a stabilized alumina.

2 Claims, No Drawings

PROCESS FOR PRODUCING STABILIZED ALUMINA HAVING ENHANCED RESISTANCE TO LOSS OF SURFACE AREA AT HIGH TEMPERATURES

FIELD OF THE INVENTION

The present invention relates to a process for producing alumina that can be converted to a catalyst support exhibiting enhanced resistance to loss of surface area when subjected to high temperatures.

BACKGROUND OF THE INVENTION

One of the key requirements of a catalyst support or substrate such as alumina ($Al_2O_3$) is high surface area. Increased surface area allows for greater deposition of the catalytically active species, enhances reactivity between the catalytically active species and the reactants and, in general, makes for a more efficient catalyst support. In the case of catalyst supports of alumina used in catalytic converters for automobiles, i.e., autocatalyst supports, high surface area is particularly desirable because of short residence times between reactants and catalytic species, the desire to minimize the size of the catalytic converter, and hence the need for a high efficiency catalyst.

A particular problem with autocatalyst supports involves the high temperatures to which the supports are subjected. High temperatures deleteriously affect the structural integrity of the catalyst support resulting in a loss of surface area. In effect, the elevated temperatures cause the catalyst support to collapse on itself. It is known that stabilizers such as oxides of polyvalent metals, e.g., barium and the lanthanide series of elements, can stabilize auto catalyst supports in the sense that the loss of structural integrity of the support is retarded. In particular, oxides of such metals have been used in alumina based auto catalyst supports as heat stabilizers.

As disclosed in the U.S. patent application Ser. No. 07/849,882 filed Mar. 12, 1992, there is disclosed a process for producing alumina for use in catalyst supports that exhibits enhanced resistance to loss of surface area under high temperature conditions in which a boehmite alumina, treated according to the process of U.S. Pat. No. 4,676,928, is worked as by shearing so as to increase the pore volume of the worked boehmite alumina, a stabilizer being added to the boehmite alumina, the stabilizer being an oxide of a metal such as barium or a metal included in the lanthanide series of metals or compounds of such metals that convert to an oxide at elevated temperatures.

SUMMARY OF THE INVENTION

It is therefore an object of the present invention to provide a process for producing stabilized aluminas which can be used in catalyst supports and other structural substrates requiring high surface area.

Another object of the present invention is to provide a catalyst support exhibiting enhanced resistance to structural degradation at high temperatures.

The above and another objects of the present invention will become apparent from the description given here and the appended claims.

According to the process of the present invention, a stabilized alumina, e.g., gamma alumina, of enhanced resistance to high temperature surface area loss is prepared by forming an aqueous slurry of a precursor boehmite alumina and a stabilizer that can be a water-soluble compound of a polyvalent metal cation in Groups IIA or IIIB of the periodic table, an oxide of such metals, a compound containing such metals which, upon hydrolysis in an aqueous medium, will form a compound and/or an oxide of such a metal cation as well as mixtures thereof, the stabilizer being present in an effective amount. The slurry of the precursor boehmite alumina and the stabilizer is hydrothermally treated at a pH of from about 3 to about 9 and at a temperature above about 70° C. for a period of time sufficient to convert the greater portion of the boehmite alumina to a colloidal sol, the recovered sol being calcined to produce a stabilized alumina exhibiting enhanced resistance to structural degradation at high temperatures.

DESCRIPTION OF THE PREFERRED EMBODIMENTS

In U.S. Pat. No. 4,676,928 ('928 Patent), incorporated herein by reference for all purposes, there is disclosed a process to hydrothermally treat a boehmite alumina so as to produce a highly water-dispersible boehmite alumina. It has now been found that by carrying out the process disclosed in U.S. Pat. No. 4,676,928, in the presence of certain stabilizers, hereinafter defined, it is possible to ultimately obtain a calcined alumina that is stabilized, i.e., exhibits enhanced resistance to structural degradation at high temperatures, e.g., greater than about 1000° C.

Stabilizers that are useful in the process of the present invention include the following: (a) water-soluble salts of with polyvalent metal cations from Groups IIA and IIIB of the periodic table, (b) oxides of such metals, (c) compound-containing metals from Groups IIA and IIB of the periodic table that hydrolyze in aqueous solutions to produce water-soluble salts of polyvalent metal cations and/or oxides of such metals, and (d) mixtures thereof. Non-limiting examples of suitable stabilizers include calcium nitrate, calcium acetate, strontium acetate, strontium nitrate, barium acetate, lanthanum nitrate, magnesium nitrate, etc.

It has been found that the above-mentioned stabilizers, when incorporated into the process of the '928 Patent, provide a significant increase in the stability of the calcined alumina product ultimately obtained, as compared with methods wherein the stabilizers are added to alumina sols or slurries that are dried and then calcined. In addition, the method provides a simpler and more economical method of stabilizer addition than methods wherein the stabilizer is incorporated by co-hydrolysis of stabilizer and aluminum alkoxides or by co-precipitation of stabilizer and aluminum salts.

The amount of stabilizer incorporated into the process will be such as to provide an effective amount of the metal oxide when the processed alumina has been calcined, e.g., to gamma alumina. In general, an amount of stabilizer will be incorporated that will provide a metal oxide content of from about 0.5 to about 20% by weight based on the combined weight of the metal oxide and the alumina as $Al_2O_3$. The level of the metal oxide (stabilizer) in the alumina can be determined according to the following equation:

$$\% M_xO_y = 100 \times \frac{gM_xO_y}{gM_xO_y + gAl_2O_3}$$

wherein M is a multivalent metal cation and x and y are chosen to satisfy the valence of M.

To more fully illustrate the present invention, the following non-limiting examples are presented. In all cases, unless otherwise indicated, surface areas were measured on stabilized alumina powders which had been calcined for 3 hours at 1200° C. This three-hour, 1200° C. static calcination is an automotive industry standard for catalyst supports.

EXAMPLE I

This example demonstrates enhanced stability obtained using the process of the present invention. In preparing the stabilized aluminas, the following general procedure was employed. 363.6 g CATAPAL A[1] alumina slurry (11% $Al_2O_3$), 3.20 g 10% (w/w) nitric acid and various amounts of stabilizers were mixed for 10 minutes and placed in a sealed vessel. In all cases, the pH of the slurry was about 9. The vessel was then placed in a 350° F. oven and rolled to maintain dispersion of the materials. The mixture was aged for 4 hours after the 350° F. oven temperature was re-attained. The resulting sol was dried in a 150° F. oven for approximately 24 hours and the resulting dried cake crushed to powder. The powder was calcined for 3 hours at 1200° C. and the surface area measured. Table I shows the surface area of the aluminas for each stabilizer employed at each stabilizer level.

[1] Boehmite alumina marketed by Vista Chemical Co.

TABLE I

| Stabilizer | Amount Used (g) | % as Oxide | Surface Area ($m^2/g$) |
|---|---|---|---|
| $Ca(O_2C_2H_3)_2 \cdot H_2O$ | 1.27 | 1 | 28. |
| | 3.89 | 3 | 33.3 |
| | 6.62 | 5 | 24.4 |
| | 13.96 | 10 | 19.5 |
| | 22.18 | 15 | 15.0 |
| $Sr(O_2C_2H_3)_2$ | 0.81 | 1 | 25.0 |
| | 2.46 | 3 | 42.0 |
| | 4.18 | 5 | 45.4 |
| | 8.82 | 10 | 32.5 |
| | 14.02 | 15 | 29.0 |
| $Ba(O_2C_2H_3)_2$ | 0.68 | 1 | 23.0 |
| | 2.06 | 3 | 44.0 |
| | 3.50 | 5 | 55.2 |
| | 7.40 | 10 | 59.5 |
| | 11.76 | 15 | 57.5 |
| —$La(NO_3)_2 \cdot 6H_2O$— | 1.76 | 1 | 20.8 |
| | 5.38 | 3 | 30.8 |
| | 9.16 | 5 | 35.3 |
| | 19.35 | 10 | 34.5 |
| | 30.70 | 15 | 33.5 |

EXAMPLE II

This example shows the addition of stabilizers after the alumina sol has been prepared. The following general procedure was employed: 192.0 g of DISPAL[2] 18N4-20 alumina sol (20.8% $Al_2O_3$) 192.3–1538.4 g deionized water (for dilution of the gel sols) and various amounts of stabilizers were mixed. The mixture was agitated for 30 minutes to fully disperse the stabilizer. Resulting mixture was dried in 150° F. oven for 20–116 hours (depending on degree of dilution) and the resulting dry cake crushed to powder. The powder was calcined for 3 hours at

[2] Boehmite alumina produced according to process of '928 Patent and marketed by Vista Chemical Company. 1200° C. and subjected to surface area analysis. The results are shown in Table II below:

TABLE II

| Stabilizer | % Oxide | Surface Area ($M^2/g$) |
|---|---|---|
| $Ca(O_2C_2H_3)_2 \cdot H_2O$ | 1 | 13.0 |
| | 3 | 20.5 |
| | 5 | 29.2 |
| | 10 | 23.8 |
| | 15 | 17.7 |
| $Sr(O_2C_2H_3)_2$ | 1 | 16.1 |
| | 3 | 39.5 |
| | 5 | 32.8 |
| | 10 | 39.0 |
| | 15 | 36.7 |
| $Ba(O_2C_2H_3)_2$ | 1 | 16.7 |
| | 3 | 31.5 |
| | 5 | 43.0 |
| | 10 | 52.5 |
| | 15 | 53.5 |
| —$La(NO_3)_2 \cdot 6H_2O$— | 1 | 18.9 |
| | 3 | 25.3 |
| | 5 | 32.2 |
| | 10 | 35.4 |
| | 15 | 31.4 |

As can be seen by comparing the results of Table I and Table II, at a given stabilizer concentration, the addition of the stabilizer to the alumina being treated according to the process of the '928 Patent, with few exceptions, results in a stabilized alumina demonstrating increased stability. For example, if one compares the results for each of the above-mentioned stabilizers at the 5% by weight concentration, except for calcium, the stabilized aluminas made according to the process of the present invention demonstrate increased stability in terms of the ability to retain surface area at high temperatures.

As can also be seen by comparing the data in Tables I and II, the optimal surface area stability with each stabilizer is demonstrably higher using the process of the present invention wherein the stabilizer is incorporated while the boehmite alumina is being subjected to the process disclosed in the '928 Patent as opposed to simply adding the stabilizer to alumina that has already been processed in accordance with the teachings of the '928 Patent.

EXAMPLE III

Using the procedures of Examples I and II, magnesium nitrate was used as a stabilizer in a CATAPAL A alumina to obtain to an MgO content of 5% in the $Al_2O_3$. It was found that the calcined, stabilized alumina produced according to the procedure of Example I, i.e., employing in situ incorporation of the stabilizer in the process of the '928 Patent retained a surface area of 10.1 $m^2/g$ whereas the calcined alumina prepared by adding the magnesium nitrate to the alumina sol (alumina already processed as per process of the '928 Patent) retained a surface area of 6.6 $m^2/g$.

EXAMPLE IV 3.92 g lanthanum nitrate solution (61.1% w/w) was added to 300 g CATAPAL A alumina slurry (9.7% $Al_2O_3$), mixed and aged 24 hours at 350° F. The resulting dried alumina stabilizer had a content of 3% $Al_2O_3$. After calcining, the stabilized alumina retained a surface area of 39.3 $m^2/g$.

EXAMPLE V 2.21 g lanthanum nitrate solution was added to 20 g CATAPAL XBX[3] alumina powder (82.3% $Al_2O_3$) and 153 g deionized water. After mixing and drying at 150° F., the resulting alumina was calcined as above. The calcined alumina retained a surface area of 25.5 m²/g.

[3] Boehmite alumina

From the results of Examples IV and V, it can be seen that the addition of mineral acid is not required to achieve a superior stabilized alumina using the process of the present invention.

As the data above clearly demonstrate, the process of the present invention leads to the production of alumina having an enhanced ability to retain surface area under high temperature conditions. The processes of the present invention provide a simpler and more economical method of stabilizer addition than those which incorporate co-hydrolysis of stabilizer and aluminum alkoxides or co-precipitation of stabilizer and aluminum salts.

The foregoing disclosure description of the invention is illustrative and explanatory thereof, and various changes in the method steps may be made within the scope of the appended claims without departing from the spirit of the invention.

What is claimed is:

1. A process for preparing a stabilized alumina comprising:

forming an aqueous slurry of a precursor boehmite alumina;

admixing said aqueous slurry with from about 0.5 to about 20% by weight calculated as metal oxide based on the $Al_2O_3$ content of said stabilized alumina of a stabilizer selected from the group consisting of water-soluble salts of polyvalent metal cations of Groups IIA and IIIB of the periodic table, oxides of metals of Groups IIA and IIIB of the periodic table, compounds containing metals from Groups IIA and IIIB of the periodic table that hydrolyze in aqueous solutions to produce water-soluble salts of polyvalent metal cations and/or oxides of metals in Groups IIA and IIIB of the periodic table, and mixtures thereof;

aging said alumina slurry containing said stabilizer at a pH of from about 3 to about 9 and at a temperature greater than about 70° C. for a period of time sufficient to convert the greater portion of said alumina to a colloidal sol of boehmite alumina containing said stabilizer;

recovering said colloidal sol; and calcining said colloidal sol to produce a stabilized alumina.

2. The process of claim 1 wherein said stabilizer contains lanthanum.

* * * * *